Dec. 1, 1931.  A. R. HAUBER  1,834,489
AUTOMOBILE TENT
Filed Jan. 10, 1931  4 Sheets-Sheet 1
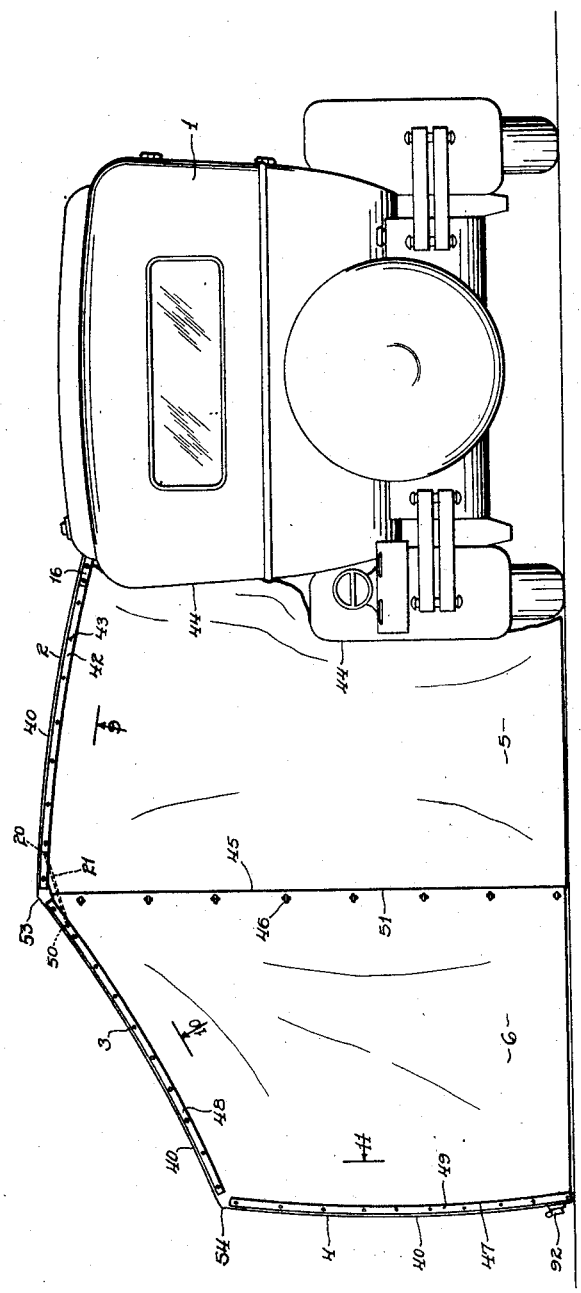
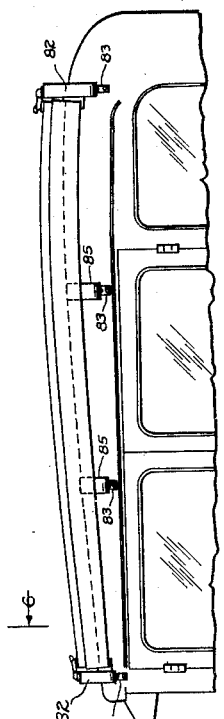
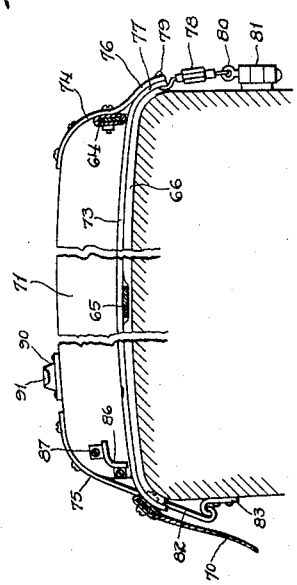
INVENTOR.
Alfred R. Hauber
BY Slough and Canfield
ATTORNEY.

Dec. 1, 1931.  A. R. HAUBER  1,834,489
AUTOMOBILE TENT
Filed Jan. 10, 1931   4 Sheets-Sheet 2

INVENTOR.
Alfred R. Hauber
BY Slough and Canfield
ATTORNEY.

Dec. 1, 1931.   A. R. HAUBER   1,834,489
AUTOMOBILE TENT
Filed Jan. 10, 1931   4 Sheets-Sheet 3
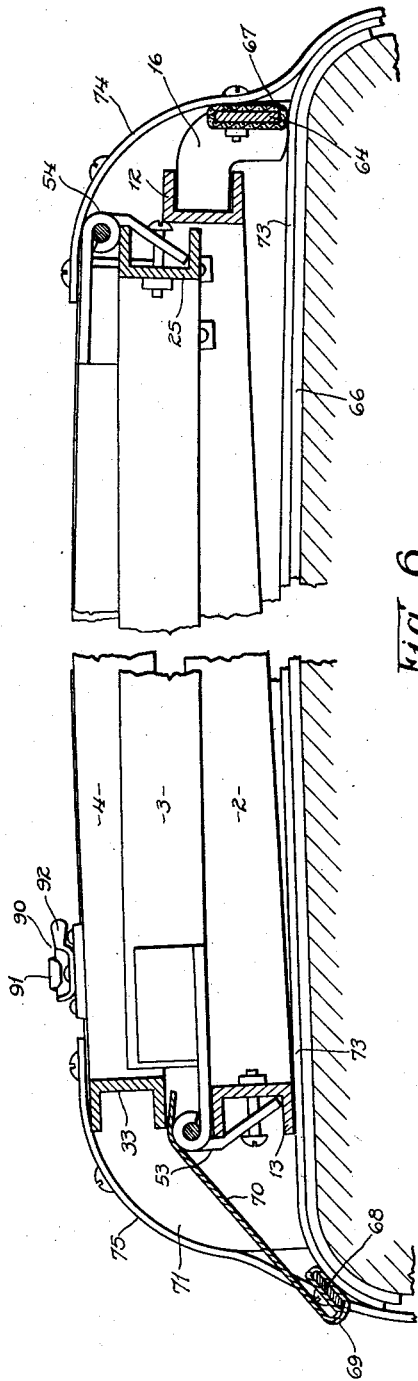
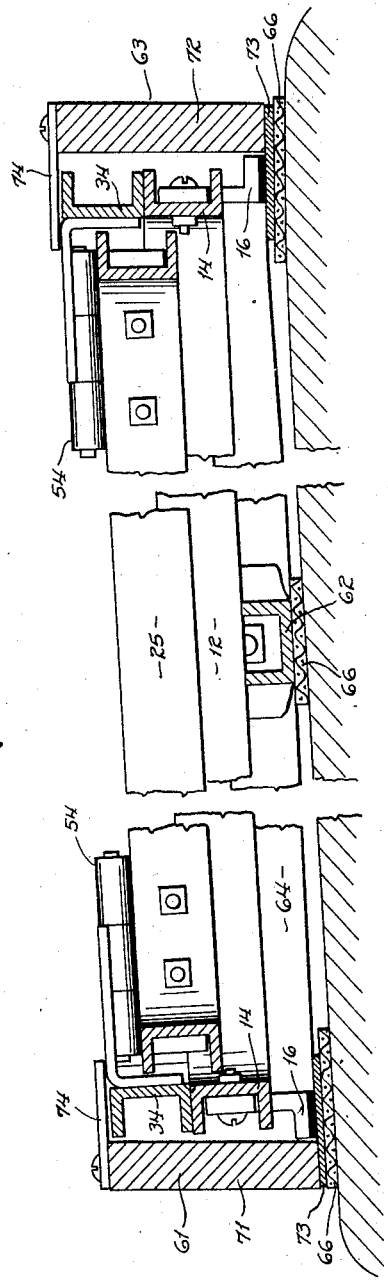
INVENTOR.
Alfred R. Hauber
BY Slough and Canfield
ATTORNEY.

Dec. 1, 1931.  A. R. HAUBER  1,834,489
AUTOMOBILE TENT
Filed Jan. 10, 1931  4 Sheets-Sheet 4

INVENTOR.
Alfred R. Hauber
BY Slough and Canfield
ATTORNEY.

Patented Dec. 1, 1931

1,834,489

UNITED STATES PATENT OFFICE

ALFRED R. HAUBER, OF CLEVELAND, OHIO

AUTOMOBILE TENT

Application filed January 10, 1931. Serial No. 507,846.

This invention relates to tents and particularly to tents adapted to be used in connection with an automobile.

Many automobile tourists prefer to transport a tent with them and to camp out en route rather than to stop at hotels or the like in cities.

It is therefore one of the objects of this invention to provide tent construction particularly adapted to the needs of the touring motorist which, when not in use, can be compactly folded up and stored away for transportation purposes and which, when wanted for use, can quickly and easily be unfolded and set up.

Another object is to provide a tent adapted to be folded up and stored away upon the top of a motor vehicle.

Another object is to provide for the storing and transportation of a tent an improved means adapted to be attached to the outside top portion of a motor vehicle.

Another object is to provide an improved tent frame adapted to support the covering or tent proper and constructed to facilitate the folding up and unfolding of the tent and to permit its being stored in compact form.

Another object is to provide a folding tent construction which can be operated by a single person easily and conveniently and quickly, either to unfold and set it up or to fold it up and store it away on a motor car.

Another object is to provide an improved means for storing and transporting a tent construction on the top of a motor vehicle which will be neat in appearance.

Another object is to provide a tent construction adapted to be folded up and stored away on an automobile in an improved manner, and adapted to be quickly and easily unfolded and set up for use, and which will be cheap to manufacture and efficient and durable in operation.

Other objects will be apparent to those skilled in the art to which my invention appertains.

My invention is fully disclosed in the following description taken in connection with the accompanying drawings, in which:

Fig. 1 is a view showing a tent embodying my invention and set up in position for use;

Fig. 3 is a side elevational view of the top portion of a motor car showing the tent construction of my invention folded up and stored on the top of the car;

Fig. 5 is a view taken from the plane 5 of Fig. 4 with some of the parts omitted for simplicity, the view being taken to an enlarged scale;

Fig. 6 is a view taken from the plane 6 of Fig. 3 and drawn to an enlarged scale and showing in cross-section the tent and tent carrier of my invention;

Fig. 7 is a longitudinal sectional view taken from the plane 7 of Fig. 4 and drawn to a larger scale and showing the tent and tent carrier of my invention, with the tent in the folded-up and stored-away position;

Figure 2:
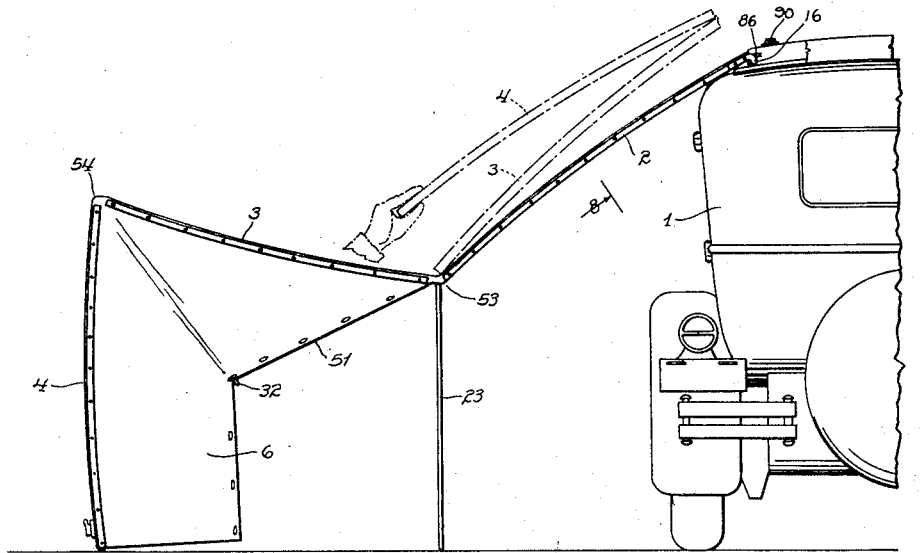
Fig. 2 is a view similar to Fig. 1 showing the tent partly set up or partly taken down and, in broken lines, indicating the manner of operating the tent construction.
Figure 4:
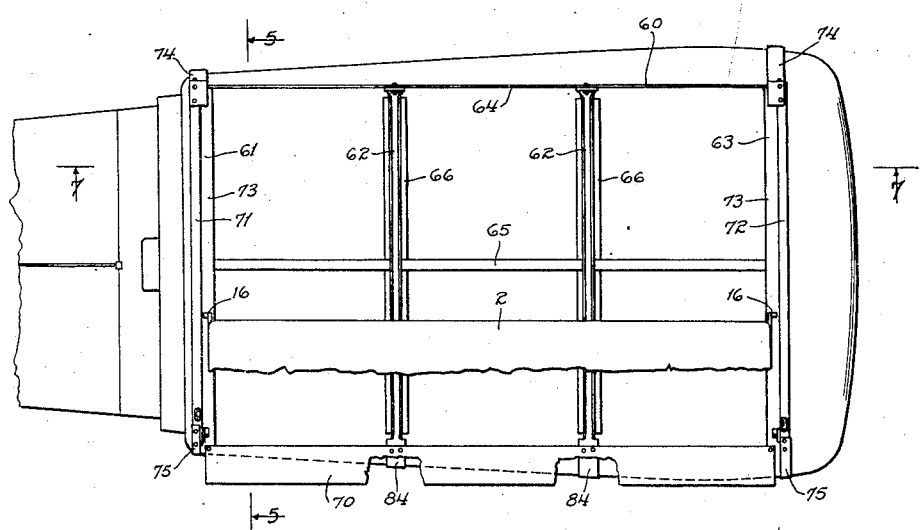
Fig. 4 is a top plan view of a motor car and illustrating a tent carrier forming part of my invention attached to the top of the car and showing a portion of the tent construction therewith.

Referring to the drawings, I have shown at 1 a motor car viewed from the rear to which the tent of my invention is attached and upon the top of which it may be folded up and stored, and to the side of which it may be erected for use. The tent when set up, and as viewed in Fig. 1 comprises generally a first top section 2, a second top section 3, a side section 4, a right rear section 5 and a left rear section 6. Forwardly of the sections 5 and 6 but not shown in Fig. 1 are front right and left sections identical with the sections 5 and 6, and will hereinafter be referred to as sections 7 and 8 respectively.

Figure 9:
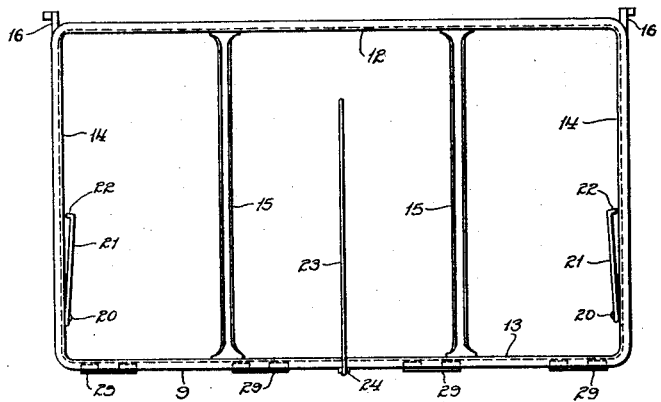
Fig. 9 is a view of a frame section forming part of the frame construction of the tent of my invention and with the tent covering thereof removed and taken approximately from the plane 9 of Fig. 1.
Figure 12:
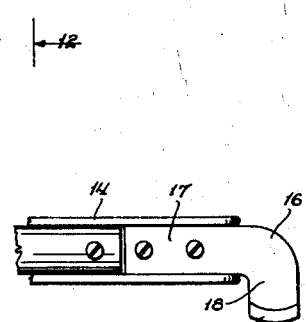
Fig. 12 is a detail view to an enlarged scale of a sliding trunnion bearing which I may employ and shown also in Figs. 4 and 9, the view being taken approximately from the plane 12 of Fig. 9.
Figure 10:
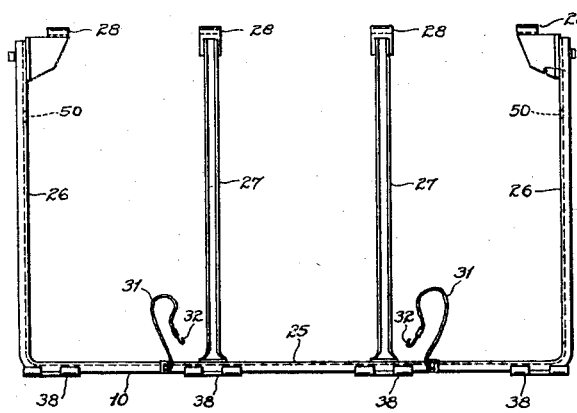
Fig. 10 is a view similar to Fig. 9 but of another frame section and taken approximately from the plane 10 of Fig. 1.
Figure 11:
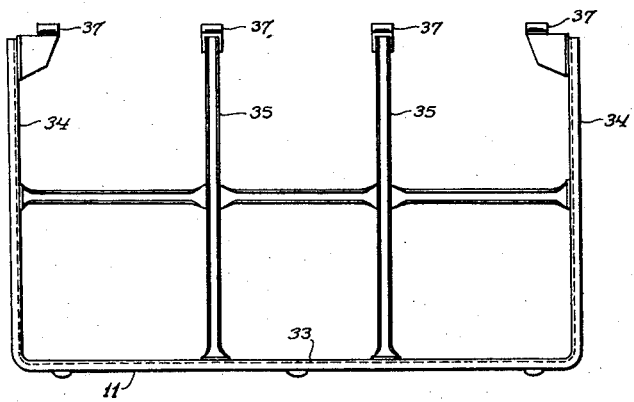
Fig. 11 is a view similar to Fig. 9 but of another frame section and taken approximately from the plane 11 of Fig. 1.

The sections 2, 3 and 4 of the tent comprise metal frames shown separately in Figs. 9, 10 and 11 and designated generally by the characters 9, 10 and 11. The frame 9 is generally rectangular in form, constructed from light weight material such as rolled channel sections of aluminium or the like, and comprises inner and outer side portions 12 and 13, similar end portions 14—14 and intermediate connecting brace portions 15—15 parallel to the end portions 14 and spaced therefrom. On its inner side 12, and adjacent the corners of the frame is provided a pair of laterally extending trunnion elements 16—16, one of which is shown separately in Fig. 12. When the tent is in the position of Fig. 1, the trunnion elements 16 have horizontally extending bodies 17, downwardly extending fingers 18 at the end of the supporting end piece 14 and outwardly laterally extending trunnions 19. The trunnion elements 16 function to connect the frame 9 to the tent carrier on top of the motor car to be described.

The ends 14 of the section 9 have hinged thereto as at 20—20 braces 21 having hooks 22 on their outer ends to engage with perforations in the next adjacent section 3 when in the set-up position of Fig. 1.

The side 13 of the section 9 has a prop 23 hinged to the side 13 as at 24 and adapted to hang downwardly by gravity into a position shown in Fig. 2 to support the frame sections 2 and 3 during the process of taking the tent down or putting it up.

Figure 13:
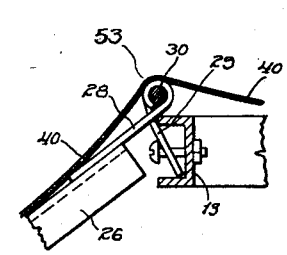
Fig. 13 is a cross-sectional view to an enlarged scale of a tent section hinged joint shown also in Fig. 1 at 53.

The tent frame section 10, shown separately in Fig. 10, comprises a side 25, similar ends 26 connected thereto and similar braces 27—27 parallel to the ends 26 and spaced therefrom. The ends 26 and braces 27 have hinge elements 28—28 secured to their free ends and adapted to connect with the mating hinge elements 29—29 on the side 13 of the section 9 as shown in Fig. 13, the pintle of the hinge being shown at 30 in that figure.

The side 25 has attached thereto a pair of elastic cords or springs 31 provided with hooks 32 on their free ends for a purpose to be described.

The tent section 4 has a frame 11, shown separately in Fig. 11, comprising a bottom 33, similar ends 34—34, similar braces 35—35 parallel and spaced from the ends 34 and a transverse brace 36 connecting the ends and the braces 34 and 35. The bottom 33 is adapted to stand upon the ground when the tent is in the set-up position, of Fig. 1. The braces 35 and ends 34 have on their free ends hinge elements 37 adapted to hingedly cooperate with corresponding hinge elements 38—38 on the side 25 of the frame section 10, as shown separately in Fig. 14, the pintle of the hinge being shown at 39.

The frame sections 10 and 11 are, like the section 9, adapted to be formed from light weight metal in rolled sections, such as channels, angles or the like, to render them strong and durable and yet small in size.

Figure 8:
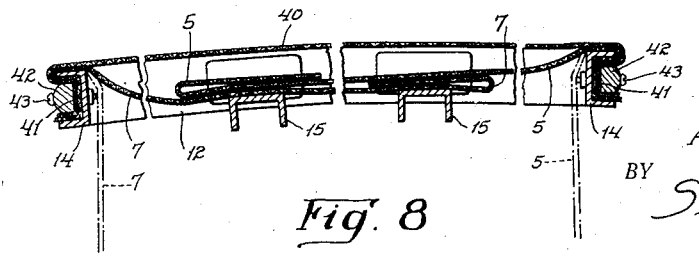
Fig. 8 is a sectional view to an enlarged scale taken from the plane 8 of Fig. 2.

The frame sections 9, 10 and 11 after being hinged together and disposed in the set-up position of Fig. 1, take up the position of the sections 2, 3 and 4 respectively and are covered on their outer portions with a layer of canvas, duck or other tent material. In Fig. 8 is shown a cross-sectional view of the top section 2, the frame ends 14—14 and the braces 15—15 and side 12 all being plainly shown. The outer covering 40 of the tent material extends over the ends 14—14, preferably being disposed in the channel portions thereof as at 41, in cases where the ends 14 are of channel section, and is securely fastened to the ends 14 by strips of wood or the like 42 laid in the channels of the ends 14 on the tent material 41, and secured to the ends 14 by bolts or screws 43 extending through the strips 42 and the tent material 41 into the ends 14. In a similar manner, the tent covering 40 is secured to the frame elements 10 and 11, as indicated in Fig. 1.

Figure 14:
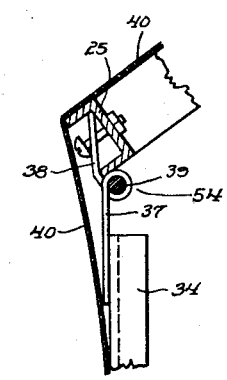
Fig. 14 is a cross-sectional view of a tent section joint drawn to an enlarged scale and shown also in Fig. 1 at 54.

The manner in which the tent material 40 overlaps the hinge connection between the frame element is shown in Figs. 13 and 14.

As plainly shown in Fig. 8, the right rear section 5, constructed from tent material such as canvas or the like is also clamped between the strips 42 and the end 14 and hangs downwardly from the said end to the ground, and in its upper portion may be coextensive with the end 14 of the frame and thus extends from the side of the motor car as at 44—44, closely engaging the same to a central vertical edge thereof 45 where it may be joined by snaps or the like 46—46 to the left rear section 6, which latter is suspended from above, being secured to the end 26 of the frame section 10 by a manner of construction similar to or identical to that illustrated in Fig. 8 for the frame 14.

Likewise, the side edge 47 of the left rear section 6 may be secured to the end 34 of the frame section 11 in a similar or identical manner to that described. The strip for securing the upper end of the section 6 is shown at 48, Fig. 1, and that for securing the side edge of the section 6 is shown at 49 in Fig. 1.

In Fig. 8 is shown a front right section 7 directly forwardly of the section 5 and in Fig. 1 concealed thereby, and it will be understood that it may be secured to the frame section 9 in the same manner as section 5 is secured thereto and to the other end 14 thereof. Similarly, a front left section 8, not shown in the drawing, but corresponding to and connected to the section 7 on the front of the tent may be provided and constructed and connected to the frame members identical to the manner described above for section 6.

The tent thus far described is self-supporting when in the set-up position, Fig. 1, the motor car 1 supporting the right hand end of the section 2, sections 2 and 3 being hinged together as at 53 and braced to prevent hinging collapsing movement by the brace 21 above referred to which is hinged as at 20 to the section 2, and at its opposite end is inserted in a perforation indicated at 50 in the frame section 10. The section 4 supports the left hand end of section 3 as viewed in Fig. 1, its own lower end resting directly on the ground.

Preparatory to folding up the tent to store it on top of the motor car, the brace 21 is removed from the perforation 50 and the hinge joint 53 is allowed to drop, until the prop 23 rests upon the ground, as shown in Fig. 2. The prop 23 during the use of the tent in its erected position is swung up and secured to the roof of the tent inside thereof. The front and rear sections 5 and 7 are then folded up into the frame section 9 as shown in solid line, Fig. 8, the folds thereof lying between the cover 40 and the braces 15—15 as plainly shown in that figure. This operation has already been performed with tent as viewed in Fig. 2.

The left front and rear sections 6 and 8 are next engaged by the hooks 32, Figs. 10 and 2, at points of the said sections 6 and 8. The point may be in the middle of the edge 51 of these sections where they are joined by the snaps 46 or the like to the edge 45 of the sections 5 and 7. The cords 31 to which the hooks are attached, being resilient, draw the sections to which they are now hooked inwardly and upwardly toward the hinge connection at 54. The sections 3 and 4 may now by hand be folded up into the position shown in broken lines in Fig. 2 where, as shown, all three sections 2, 3 and 4 may be superimposed upon each other into a compact group, and during the folding operation around the hinge connection at 54, the sections 6 and 8 are drawn back inwardly toward the hinge so as to lie flatly disposed between the sections 3 and 4.

The prop 23 may now be stored away under the section 2, and the whole group of sections is ready to be stored on top of the vehicle in the carrying device thereon, which will now be described.

Referring to Figs. 3, 4, 5, 6 and 7, a carrier frame indicated generally at 60 is mounted upon and supported upon the top of the motor vehicle and comprises a plurality such as four generally transverse elements, 61, 62—62 and 63, disposed in spaced parallel relation transversely of the top. At one side of the top, the transverse elements are all connected together by a longitudinal strip 64 and generally along the medial line of the top they are connected together by a longitudinal strip 65. The transverse elements and the strips are preferably made from light weight material such for example as aluminum in channel or other cross-sectional shape to render them stiff and strong. The transverse elements 61 to 63 have thereunder, to protect the material from which the vehicle top is made, felt or other relatively soft strips 66—66.

For the sake of neat appearance, the strip 64 may be placed edgewise as shown in Fig. 6 and covered with leather, imitation leather or the like 67. If desired, a strip 68 similar to the strip 64 may be disposed longitudinally on the opposite side of the vehicle top from the strip 64 and connect the elements 61 to 63 and may be laid flatwise as shown in Fig. 6 and covered with a layer of leather, artificial leather or the like 69 which may extend therefrom in the form of a flap 70, Figs. 4 and 6, and which, when the elements of the tent are folded up on top of the vehicle top as shown in Fig. 6, and to be more fully described, may be spread over the lateral edges of the compactly folded tent to cover the same and conceal them from view, as well as to protect them from the entrance of dust into the interfolded parts of the tent.

The strip 68 is preferably laid flatwise as shown in Fig. 6 to facilitate movement of the parts of the tent over it to and from their position on top of the car.

The transverse elements 62—62 may be of any preferred form and serve to hold the parts of the tent away from the vehicle top and to stiffen and strengthen the carrier frame 60 as a whole. The transverse elements 61 and 63, however, serve not only as elements of the frame, but as enclosing ends and trackways for the storing and for the operation of the tent, now to be described. The elements 61 and 63 may be identical or similar and are clearly shown in Figs. 5, 6 and 7. They comprise vertically disposed body portions 71 and 72 cally horizontal flange portions thereunder 73—73, secured thereto. At the ends of the elements 61 and 63, members 71 and 72 are rounded off and covered with arcuate strips of metal 74 and 75, and the strip 74 overlaps inwardly of the body portions 71 and 72 to form end flanges of the body portions.

The carrier thus far described is secured to the top of the vehicle generally as shown in Fig. 5. At the ends of the carrier, the strips 74—74 extend downwardly over the side of the vehicle top as at 76, Fig. 5, where they are joined by extensions 77 of the flanges 73, and a turnbuckle device 78 is hooked as at 79 into the parts 76 and 77 at one end and at the other end is secured as at 80 to an eye-form pintle of a door hinge 81 of the car, or, in designs of car body not provided with conveniently located hinges, the lower end of the turnbuckle 78 may be secured to an attaching device attached to the side of the car body for the purpose. On the opposite side of the car, the strips 75 are extended downwardly over the side of the top and terminate in hooked portions 82, Fig. 5, hookingly engaged with attachments 83 secured to the side of the car body for the purpose. Similarly, if desired, the transverse elements 62—62 may, at their ends on the left hand side of the car top, terminate in flange portions 84—84, bent downwardly to conform to the shape of the car top and terminating in hook portions 85—85 similar to the hook portions 82 and engaged with other hook devices 83—83, see also Fig. 3.

Thus by means of the turnbuckle devices 78 and the hook devices described, the entire carrier 60 may be tightly clamped downwardly upon the vehicle top to secure it against shifting thereon, the top being in turn protected by the felt strips 66—66 above described.

When the carrier and tent construction are installed on the car, the trunnion element 16 of the frame section 9 rests upon the flanges 73, see Fig. 7, and may slide thereon transversely of the car top to take up the position shown in Fig. 6 when the tent is on the carrier, or may take up the position shown in Fig. 2 when the tent is removed from the carrier.

The strips 74, Fig. 7, stop the movement of the trunnion elements 16 and prevent the trunnion elements from sliding off of the flanges 73, and when the trunnion elements 16 slide in the opposite direction toward the left hand side of the car top, the trunnion elements are stopped at a predetermined position, shown in Fig. 2, by stop devices 86, Figs. 2 and 5, which may be pieces of metal bent into angle form and provided with ears 87 by which they may be secured to the inner walls of the body portions 71 and 72 of the transverse elements 61 and 63.

Thus it will be understood that when the tent is in the solid line or broken line position of Fig. 2, or in the full erected position of Fig. 1, the first top section 2 is locked upon the car top, or upon the carrier, by engagement of the trunnion elements 16 with the stop 86.

When it is desired to store the tent construction on the carrier, the tent is collapsed from the position of Fig. 1 to the solid line position of Fig. 2 and thence to the broken line position of Fig. 2, and then the operator grasps the lower edges of the tent sections 2, 3 and 4 and pushes them toward the car top, whereupon the trunnion elements 16 slide transversely of the top along the flanges 73, being constrained against movement longitudinally of the top by the body portions 71 and 72 of the transverse elements 61 and 63 until the trunnion elements 16 engage the flanges 74 at the ends of the transverse elements and are stopped thereupon. The folded tent sections then will lie upon the carrier and in collapsed or folded up position as shown in Figs. 6 and 7. At this time, the flap 70 may be put into place as shown in Fig. 6, the position of the flap 70 when the tent is removed from the carrier being that shown for it in Fig. 5.

The dimension of the frame section 10 may be made, in the direction longitudinally of the carrier, smaller than the corresponding dimension of the frame sections 9 and 11, so that as illustrated in Figs. 6 and 7, it may nest therewithin to render the folded construction more compact. To hold the folded tent construction securely in place on the carrier, during movement of the car, I preferably employ a pair of clamp devices, indicated generally at 90, Figs. 2, 5 and 6, which may be, if desired, the lock ordinarily employed to secure a pair of window sashes to each other. A stationary element 91 of the device is secured on the upper edge of the transverse elements 61 and 63, and a movable part 92 of the device is secured on the side section 4, as shown in Fig. 1, on each outer corner thereof. When the tent construction is in position on the carrier as in Fig. 6, the portions 92 of the devices may be rotated or otherwise brought into engagement with the stationary portions 91 of the devices to force the entire folded tent construction downwardly upon the flanges 73—73.

It will be observed that the flap 70 when unfolded into the position shown in Fig. 5, will protect the top and the upper side portions of the car body from being abraded or otherwise marred by sliding of portions of the tent construction into and out of the carrier.

Hereinbefore has been described the steps of the operation of collapsing the tent from the position of Fig. 1 and storing it on top of the car in the carrier. By similar operations in the reverse order, the tent may be removed from the carrier and set up into the position of Fig. 1 for use, and the entire operation may be conveniently and quickly performed by a single person.

The frame sections 9, 10 and 11 are preferably generally planular. In cases where the top of the vehicle is flat or strictly planular, the sections may be strictly planular, but for use on vehicles the tops of which curve longitudinally and transversely, the sections 9, 10 and 11 are preferably only generally planular, that is to say, being slightly curved to conform to the shape of the top so as to lie compactly thereon. This curvature is illustrated plainly in Figs. 1 and 2, and 8. In this connection, the elements composing the carrier 60 are preferably curved so as to conform to and lie closely adjacent to the top of the vehicle. By this means, tent sections of considerable thickness may be piled in a tier on the carrier without detracting materially from the lines of design of the vehicle top.

Hereinbefore I have described my invention as comprising a tent construction and a carrier therefor, the carrier being adapted to be secured upon the top of a motor vehicle, on the outside thereof. To those skilled in the art to which my invention appertains, it will be apparent that the advantages thereof may be enjoyed if the carrier be associated with the top but on the inner or underside thereof.

To this end the frame elements 61 and 63 may be supported by any suitable means within the car body and adjacent the top thereof, and to permit the movement of the tent construction onto the carriage for transportation purposes and to permit the removal thereof laterally into the setup position of Fig. 1, a longitudinal doorway or opening may be provided in the side of the car body adjacent the roof and above the line of the doors and windows, the aperture being covered by a door or flap when the tent is folded up on the carrier in the car. Having fully described an embodiment of my invention in the form in which the carrier is on the outside of the car top, it is not believed necessary herein to show or further describe the form in which the carrier is associated with the top but within the car.

In other respects also, my invention is not limited to the exact details of construction shown and described since other modifications and many changes may be made therein without departing from the spirit of my invention or sacrificing its advantages.

I claim:

1. A tent and transporting apparatus therefor comprising a plurality of tent composing sections hinged together and foldable into a tier, a carrier adapted to be associated with the top of a motor vehicle, and cooperating means on at least one of these sections and on the carrier whereby the tier of sections may be slidably moved transversely of and guided on the carrier.

2. A tent and transporting apparatus therefor comprising a plurality of tent composing sections hinged together and foldable into a tier, a carrier adapted to be associated with the top of a motor vehicle, and cooperating means on at least one of these sections and on the carrier whereby the tier of sections may be slidably moved transversely of and guided on the carrier to move them from transportable position on the carrier to an unfolding tent composing position laterally of the vehicle and vice versa.

3. A tent and transporting apparatus therefor comprising a plurality of tent composing sections hinged together and foldable into a tier, a carrier adapted to be associated with the top of a motor vehicle, and cooperating means on at least one of the sections and on the carrier whereby the tier of sections may be slidably moved transversely of and guided on the carrier to move them from transportable position on the carrier to an unfolding tent composing position laterally of the vehicle, and means for engaging one of said sections with the carrier when the sections are unfolded to compose a tent.

4. A tent and transportation apparatus therefor comprising a carrier associated with the top of a motor vehicle, a plurality of tent composing sections hinged together, including a pair of roof sections, a side section depending from one of the room sections, and front and rear drape sections depending from the roof sections, the other of the roof sections having a slidable hinging connection with the carrier at one side thereof, the drape sections being foldable into the roof and side sections, the roof and side sections being foldable into a tier, and the slidable hinging connection being slidable transversely of the carrier to dispose the tier of sections on the carrier.

5. A tent and transportation apparatus therefor comprising a carrier associated with the top of a motor vehicle, a plurality of tent composing sections hinged together, including a pair of roof sections, a side section depending from one of the roof sections, and front and rear drape sections depending from the roof sections, the other of the roof sections having a slidable hinging connection with the carrier at one side thereof, the drape sections being foldable into the roof and side sections, the roof and side sections being foldable into a tier, the slidable hinging connection being slidable transversely of the carrier to dispose the tier of sections on the carrier, and means to secure the sections against shifting on the carrier from said position thereon during movement of the vehicle.

6. In an automobile tent construction, a generally planular roof section adapted to be connected to the side of a motor vehicle, a second generally planular roof section hinged to the first roof section on an axis spaced laterally from the vehicle, a generally planular side section depending from the second roof section and hinged thereto on an axis spaced laterally from the first-mentioned axis, a detachable brace connecting the roof sections and spanning the hinging axis thereof, and a first drape section suspended from the first roof section, a second drape section suspended from the second roof section and secured to the side section, and the drape section being foldable respectively into the plain of the first roof section and of a second roof section and side section, and the roof and the side sections being hingedly movable into a tier.

7. In a tent and transportation apparatus therefor, a carrier adapted to be secured upon the top of a motor vehicle and comprising transverse elements disposed adjacent the longitudinal ends of the top, a guideway on each transverse element, a stop at an end of each guideway, a first tent section, other tent sections foldably connected with the first tent section and adapted to be disposed thereupon in a tier therewith upon the carrier, a pair of sliding and hinging connecting elements on the first tent section adapted to slide in the guideways and to be stopped at the ends thereof on said stops, and the other tent sections being adapted to be then unfolded to compose a tent and the engagement of the said connecting elements with said stops connecting the tent to the vehicle.

8. A tent and transporting apparatus therefor comprising a plurality of tent composing sections hinged together and foldable into a tier, a carrier associated with the top of a motor vehicle and cooperating means on at least one of the sections and on the carrier whereby all portions of the tier of sections may be moved bodily transversely of and on the carrier to move them from a transportable position on the carrier to an unfolding tent composing position laterally of the vehicle, and vice versa.

9. A tent and transporting apparatus therefor comprising a plurality of tent composing sections hinged together and foldable into a tier, a carrier associated with the top of a motor vehicle, and cooperating means on at least one of the sections and on the carrier whereby the tier of sections may be moved bodily transversely of and on the carrier.

In testimony whereof I hereunto affix my signature this 7th day of January, 1931.

ALFRED R. HAUBER.